Dec. 29, 1942.　　　H. A. TIESLAU　　　2,306,474
VEHICULAR SHOVEL
Filed July 24, 1940　　　3 Sheets-Sheet 1
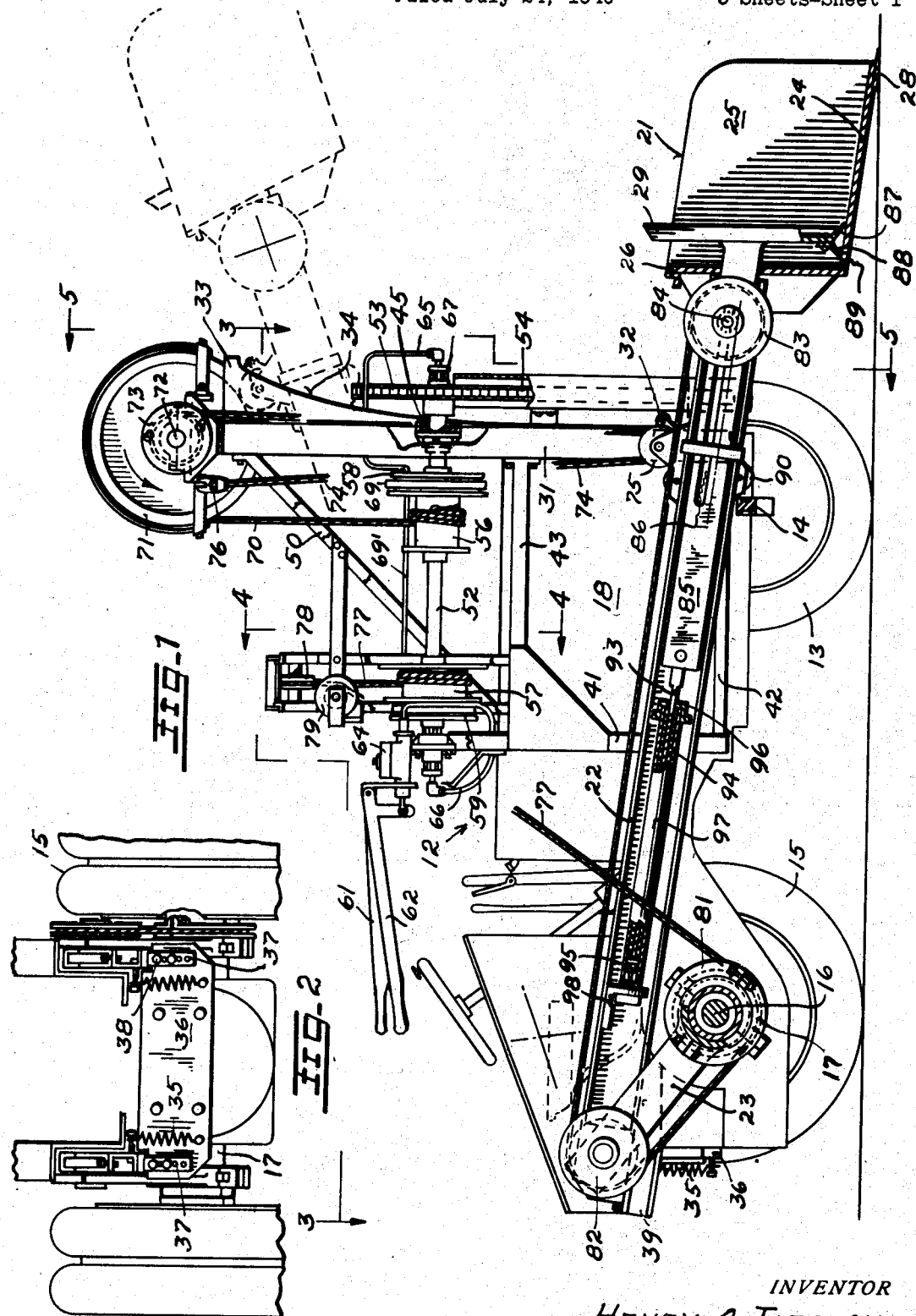
INVENTOR
HENRY A. TIESLAU
BY Henry N. Young
ATTORNEY Dec. 29, 1942.　　　H. A. TIESLAU　　　2,306,474
VEHICULAR SHOVEL
Filed July 24, 1940　　　3 Sheets-Sheet 2
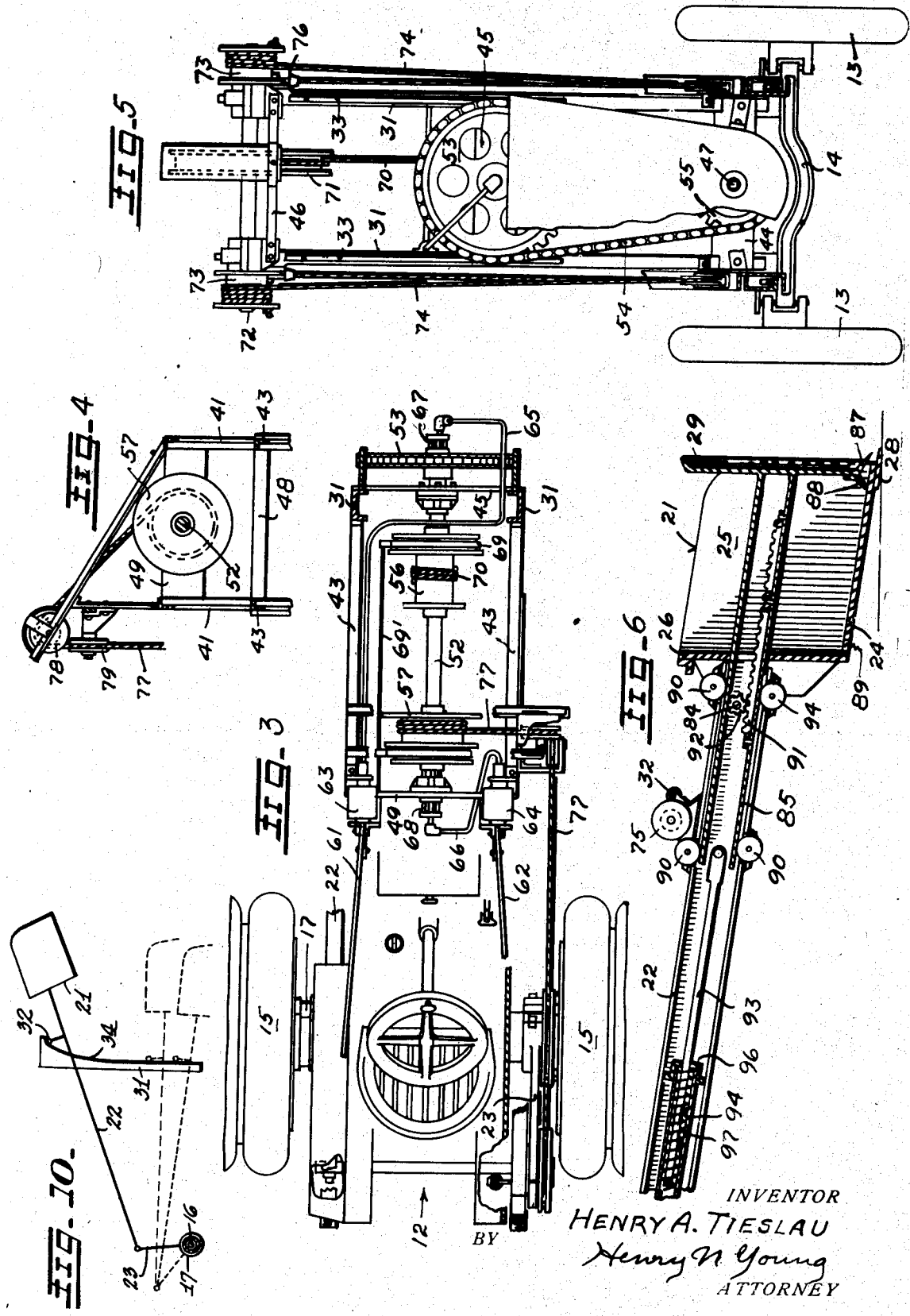
INVENTOR
HENRY A. TIESLAU
BY Henry N. Young
ATTORNEY Dec. 29, 1942.   H. A. TIESLAU   2,306,474
VEHICULAR SHOVEL
Filed July 24, 1940   3 Sheets-Sheet 3
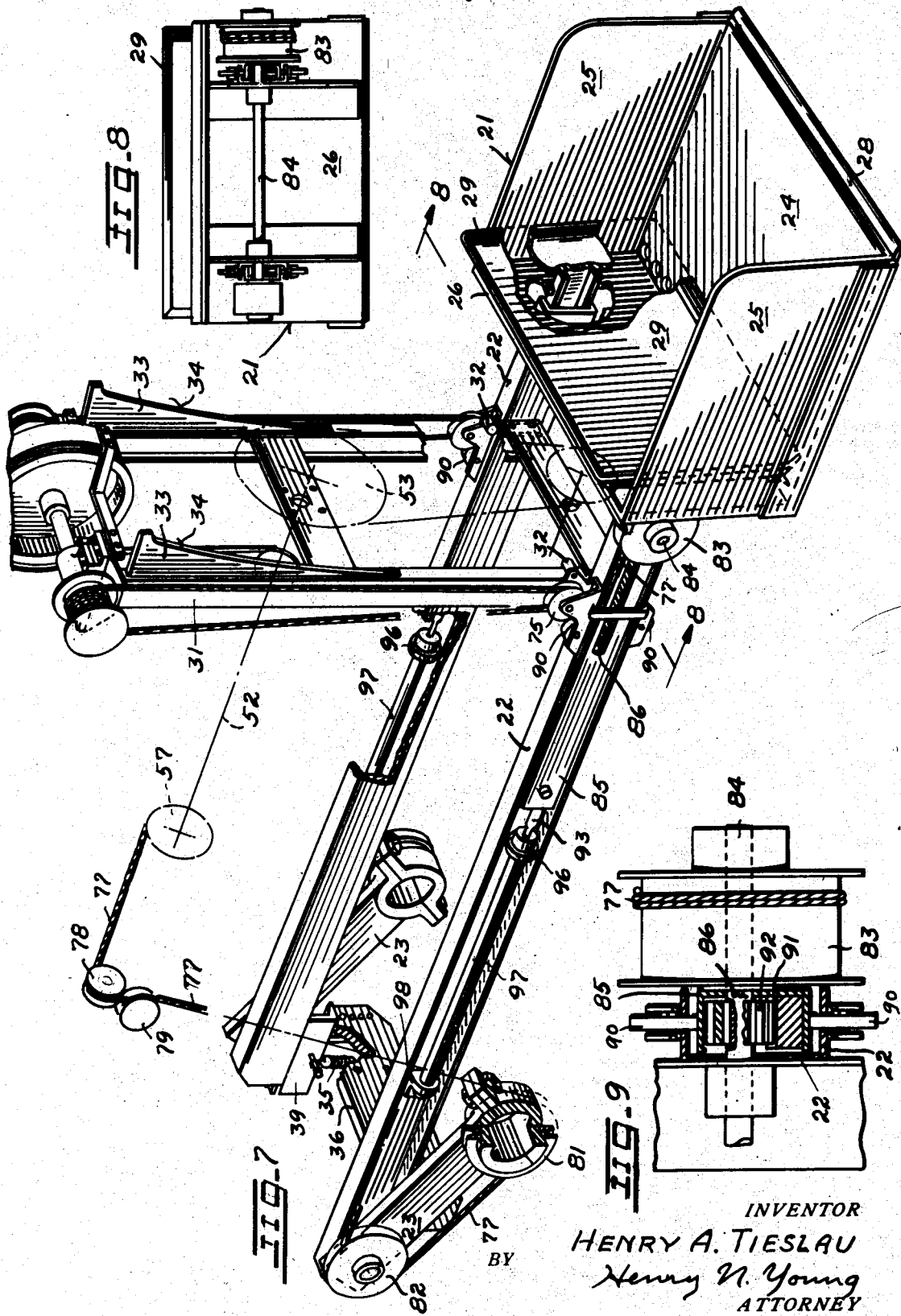
INVENTOR
HENRY A. TIESLAU
BY Henry N. Young
ATTORNEY Patented Dec. 29, 1942

2,306,474

UNITED STATES PATENT OFFICE 2,306,474

VEHICULAR SHOVEL

Henry A. Tieslau, Berkeley, Calif.

Application July 24, 1940, Serial No. 347,179

7 Claims. (Cl. 214—139)

The invention relates to a shovel attachment for mounting on and operation by a tractor.

An object of the invention is to provide an improved shovel unit of the type described which may be readily attached to a tractor to have its scoop disposed in front of the tractor for its loading with material at or adjacent the ground level by driving the tractor forwardly.

Another object is to provide an improved structure having the scoop mounted on a swinging frame which is so connected to the tractor that the thrust of loading the scoop is taken mainly against the drive axle of the tractor.

A further object is to provide for the swinging of the scoop frame to raise the scoop for its unloading into a raised receptacle such as the bed of a truck.

An added object is to provide for unloading of the scoop by pushing the material therein forwardly to fall from its front lip.

Yet another object is to automatically provide a minimized angularity of the scoop bottom to the horizontal as the scoop is raised for its unloading.

A still further object is to provide means for utilizing the power of the tractor engine to position the scoop and effect its unloading.

The invention possesses other objects and features of advantage, some of which, with the foregoing, will be set forth or be apparent in the following description thereof, and in the accompanying drawings, in which, Figure 1 is a side elevation of a scoop unit embodying the features of present invention and mounted on a tractor, the near side tractor wheels being removed.

Figure 2 is a fragmentary rear view of the combination of Figure 1.

Figure 3 is a partially sectional and fragmentary plan view taken at the line 3—3 in Figure 1.

Figure 4 is a fragmentary sectional elevation taken at the line 4—4 in Figure 1.

Figure 5 is a front elevation taken at the line 5—5 in Figure 1.

Figure 6 is a fragmentary vertical section through the scoop and a supporting arm of its frame, a load-ejection element of the scoop being shown in its forward position.

Figure 7 is an enlarged perspective view of the scoop unit, portions of the structure being broken away.

Figure 8 is a section taken at the line 8—8 in Figure 7.

Figure 9 is an enlargement of a portion of the Figure 8.

Figure 10 is a diagram showing the relation of certain scoop-supporting and positioning parts when the scoop is in the raised position indicated in Figure 1.

The present scoop unit has been particularly designed for mounting on and in operative association with a usual type of wheeled tractor 12 having dirigible front wheels 13 carried at the ends of an axle 14, and rear wheels 15 mounted on axles 16 extending from a usual differential drive enclosed in a differential and axle housing 17. A usual chassis frame connects the front axle 14 and differential housing 17 for the support of the tractor engine 18 and its fuel tanks and control devices and the operator.

The scoop assembly essentially comprises a scoop 21 fixed at the forward ends of mutually coplanar and more or less parallel arms 22 which are rigidly related and spaced to receive the tractor chassis between them. At their rear ends the arms 22 are pivoted to arms 23 which in turn are swingably mounted on the differential housing 17. Assuming, for descriptive convenience, that the ground supporting the tractor is horizontal, it will be noted that the rigidly related arms of the scoop frame slope downwardly from their rear ends when the scoop is disposed to pick up material at or adjacent the ground level, and slope upwardly when the scoop is raised above the horizontal for the discharge of material therefrom.

The scoop 21 has a bottom 24, sides 25, and a back 26, these elements comprising plates which are integrally connected and define a load-receiving space which is open at the top and front. At its forward edge, the bottom plate 24 is provided with a separate and relaceable lip member 28 which may have a sharpened working edge and be otherwise constructed to facilitate its entry beneath and/or through material to be loaded.

A partition 29 is mounted in the scoop space in parallel relation to the scoop back 26 for its movement between limiting positions adjacent said back and adjacent the lip 28, said partition being disposed back from the lip 28 during loading and being projected forwardly in the space as a push plate for unloading material from the scoop; this arrangement eliminates any need for a pivoted mounting of the scoop as a whole, or the scoop bottom, on the scoop frame. When the scoop is lowered for the loading thereof with the push plate withdrawn, usually though not necessarily to the back of the load space, the scoop bottom makes a relatively small angle with the horizontal whereby the working edge of the lip 28 may constitute the lowest point of the scoop. When the scoop is raised for its unloading, its bottom 24 will be horizontally disposed when the arms 22 extend upwardly from their rear pivot point to make the same angle with the horizontal as the scoop bottom makes with them. Further raising of the scoop will dispose the scoop bottom in rearwardly sloping position, and so increase the power necessary to operate the push plate 29 for discharging the load from the scoop.

It will now be noted that if the arm 22 were directly pivoted on the differential housing 17, the raising of the scoop to an appropriate height for its discharge on to the bed of a truck or other relatively high receptacle or conveyor would so tilt the scoop bottom 21 as to require an undue application of power to the push plate 29 for discharging the load from the scoop, and the present arrangement including the arms 23 has been provided to lessen the angularity of the scoop bottom when it is raised. As shown, the arms 23 slope upwardly and rearwardly from the differential housing 17 which mounts them whereby said arms overlie said housing and are relatively close thereto when the scoop is lowered to a loading position which will usually be one in which its lip is operative in the plane of the supporting ground.

Standards 31 are fixed to the tractor structure at its forward end and at opposite sides thereof and comprise parts of a frame assembly which carries certain positioning control elements for the unitary scoop assembly and the push plate 29 of the scoop. The standards 31 are disposed inwardly of and adjacent the arms 22 which carry rollers 32 disposed in front of the standards 31 for rotation about an axis which is parallel to the plane of the standards. Assuming that the arms 22 and 23 are in lowered positions, as is the case when the scoop is lowered, a raising of the scoop would, after the arms 22 are raised above a certain point, engage the rollers 32 with the front sides of the standards to cause an upward swinging of the arms 23, since distances between the rollers 32 and the pivotal connection for the arms 22 and 23 is constant. Such a movement of the arms 23 raises the pivotal axis of the scoop frame and so reduces the slope of the scoop bottom below that which it might attain if the pivotal axis of the arms 22 was fixed with respect to the tractor. The arrangement is preferably such that the arms 23 will be substantially vertical when the scoop reaches its limiting raised position, this being illustrated in Figures 1 and 10 and being insured by the provision of cam plates 33 mounted on the standards 31 to extend forwardly therefrom and having appropriately curved front edges 34 for engaging the rollers 32. It will be noted that another result of the action of the forwardly curving cam plates 33 is to dispose the raised scoop further in front of the supporting tractor 12 than when it is in loading position, thereby providing more scoop-unloading clearance with respect to the tractor than would otherwise be provided.

Means are preferably provided for preventing the resting engagement of the arms 22 upon the differential housing 17 when said arms are in their lowered position which is urged at their rear ends by the action of springs 35 which are operative between the arms and anchorages on the tractor structure. As particularly shown, a plate 36 is fixed to and across the rear end of the tractor frame to have its ends disposed in the planes of movement of the arms 22, and mounts stop members 37 for adjustment in said planes to limit the downward movement of the underlying portions of the arms 22. The stop members 37 are shown as comprising perforated blocks which may be adjustably secured to the plate 36 by cap screws 38 and members 39 are fixed on the ends of the arms 22 for contact with the stops 37, and the springs 35 are operative between these members and anchorages on the plate 36. It will be understood that the positioning of the stops 37 provides for an adjusted spacing of the lowered arms 22 with respect to the differential housing 17.

It will now be noted that the standards 31 form part of a framework which straddles the forward part of the tractor and includes side uprights 41 disposed rearwardly of the standards 31 and connected to the standards by longitudinal members 42 and 43. The standards 31 are of channel section, and the forward edges thereof are connected by cross-members 44, 45, and 46 at bottom, intermediate and top points thereof, it being noted that the member 44 extends in front of the tractor engine and receives the free end of the crank shaft 47 of the tractor engine therethrough. The uprights 41 are connected by cross-members 48 and 49, the member 48 just clearing the tractor engine and the member 49 connecting the top ends of the uprights. Diagonal braces 50 connect top points of the standards 31 with rear points of the side frame members 43, and the frame is otherwise constructed and braced to provide a rigid structure which is utilized for the support of independent controls for the adjusted positioning of the scoop with respect to the support base of the vehicle and the operation of the push plate 29 of the scoop.

The cross-members 45 and 49 are at the same level above the tractor engine, and a shaft 52 is journalled on and between them to extend longitudinally of the tractor and with its forward end extending beyond the member 43 and mounting a sprocket gear 53. A chain 54 operatively connects the gear 53 with a sprocket gear 55 fixed on the crank shaft 47 in mutually coplanar relation with the first gear, whereby the shaft 52 may be constantly driven from the operating tractor engine. Cable drums 56 and 57 are supported on the shaft 52 and are normally rotatable on and with respect to the shaft, and clutch assemblies 58 and 59 are provided on the shaft 52 for actuation to selectively connect the drums 56 and 57 respectively with the shaft 52 for wind-on rotations thereof.

The clutches 58 and 59 may be of any suitable structure which provides for their operative engagement with the drums as long as may be desired. In the present instance, the clutches 58 and 59 are hydraulic and are arranged for setting by the operation of levers 61 and 62 respectively to operate pistons in pressure cylinders 63 and 64 in a well-known manner. The connections from the hydraulic cylinders 63 and 64 are provided through conduits 65 and 66 extending from the different cylinders to the ends of the shaft 52 at which swivel couplings 67 and 68 provide connections with axial shaft ducts (not shown) to the different clutches. The drums 56 and 57 are normally engaged by brake bands 69 to secure them against rotation; and said bands are arranged to be automatically and selectively loosened by action of the levers 61 and 62 through appropriate connections including rods 69' as a clutch 58 or 59 is engaged.

A flexible wire cable 70 has one end secured to the drum 56 and the other end secured to a drum 71 which is fixed on a shaft 72 mounted on top of the standards 31 in the plane thereof. The shaft 72 extends beyond the standards 31 and carries cable drums 73 fixed to both extending ends thereof, and the drums 73 are utilized for raising the scoop by means of a cable 74 extending therefrom beneath pulleys 75 mounted on the side arms 22 of the scoop assembly to anchorages 76 at the upper standard ends. This scoop positioning arrangement is such that a rotation of the drum 56 to wind the cable 70 thereon will correspondingly unwind the latter from the drum 71 to rotate the drums 73 for winding the cables 74 on the latter for raising the front of the scoop assembly against the influence of gravity. The pulleys 75 are disposed directly beneath the corresponding drums 73 and the sling arrangement provided is understood to permit the described forward pulling of the scoop assembly by the engagement of the rollers 32 with the front profiles of the plates 33 of the standards 31.

The drum 57 has one end of a cable 77 fixed thereto, said cable being utilized for effecting an unloading movement of the push plate 29 in the scoop 21, and the connection from the drum to the push plate is preferably such as to prevent slack or over-tight conditions in the cable when the scoop frame is disposed in different angular positions thereof. As illustrated, the cable 77 extends over a pulley 78 having its axis parallel to that of the shaft 52 thence downwardly around the forward part of a pulley 79 having its axis perpendicular to said shaft axis, thence downwardly and rearwardly around a pulley 81 suitably mounted on the housing 17 for rotation about the axis of the axle 16, thence rearwardly along the adjacent arm 23 and around a pulley 82 mounted at the common hinge point of the arm 23 and the connected arm 22 for rotation about the axis of hinging thereat, thence forwardly along the arm 22 to a connection with a drum 83 mounted on an extending end of a shaft 84 which is journalled in and between the arms 22 at a point thereof adjacent the scoop 21. As illustrated in Figures 1 and 7, the pulley 81 is mounted on a hub-like axial extension of the bearing of an arm 23 which receives the axle housing 17.

It will now be noted that the arms 22 are of channel section, have their sides horizontal, and slidably receive bars or stems 85 which extend rigidly from the push plate 29 and are slidable through complementary openings provided in the scoop back 26. The bars 85 are of channel section, with their open sides facing the webs of the arms 22, and have their webs provided with longitudinal slots 86 which freely receive the shaft 84 and are of a length to permit the full movement of the push plate 29 between the front and back of the scoop cavity; the slot ends preferably act as stops against the shaft to limit the push plate movement in the scoop.

Preferably, and as shown, the bottom of the push plate is provided with scraper edges 87 and 88 extending forwardly and rearwardly respectively, and the plate side edges are close to the scoop side 25, whereby to insure a proper unloading of loose material from the scoop. Holes 89 are provided in the scoop bottom 24 at the base of the back wall 26 for the discharge of material which may have got behind the push plate, the stop functioning of the forward ends of the slots 86 against the shaft 84 being arranged to prevent the forcible contact of the rear scraper edge 88 with the scoop back 26. As shown, side and top edge portions of the push plate 29 are turned obliquely forwardly, this stiffening the plate edges and aiding the cleaning action at the scoop sides 25 when loose and more or less adhesive material is to be discharged from the scoop.

Bearing rollers 90 (Fig. 6) are mounted in the flanges of the arms 22 to extend slightly into their channel spaces for cooperatively engaging the opposite sides of the bars 85 to minimize frictional resistance to their telescopic sliding in the arms. A flange of each bar 85 is provided with a gear rack 91 therealong, and gears 92 fixed on the shaft 84 constantly engage the racks 91; in this manner, rotations of the shaft 84 are arranged to project or withdraw the push plate 29. When the push plate 29 is in its fully withdrawn position, the connected end portion of the cable 69 has enough turns thereof wound around the drum 83 to permit an unwinding of said turns by a pull on the cable 77 to dispose the plate in its limiting forward position, it being understood that the length of cable unwound from the drum 83 will be wound upon the drum 57, and vice versa.

A spring means is provided to resist a working (unloading) movement of the push plate 29 and to store up energy for effecting a return movement of the plate when the clutch 59 is inoperative. As particularly illustrated in Figs. 1 and 6 and 7, pull rods 93 extend rearwardly from the rear ends of the bars 85 of the scoop 21 and through helical compression springs 94 which bear against seat members 95 at the free bar ends. The forward spring ends engage seats 96 which are fixedly related to the arms 22. In the present structure, tubes 97 extend forwardly from brackets 98 fixed within the channels of the arms 22 and freely receive and enclose the springs 94, and the seat members 96 comprise caps which are fixed on the forward tube ends and are centrally perforated to freely receive the pull rods 93 therethrough, it being understood that the tubes 97 provide protective sheaths for the springs.

When the scoop is to be loaded with material or articles at or near the ground level, it is disposed at the desired working level and the tractor is driven forwardly to load the scoop, the scoop is then raised and the tractor maneuvered to dispose the scoop above a receptacle or point of discharge for the material, and the scoop push plate 29 is then moved forwardly to push the material from the scoop. It will be noted that the material to be handled may comprise finely divided material such as dirt or sand, lump material such as coal or rocks, or packaged articles, and that a scoop lacking side walls may be used in handling lumber or other elongated articles. Also, the receptacle of the scoop might be loaded by hand instead of being pushed forwardly for its loading.

While I have shown the present shovel assembly as mounted on and operatively associated with a wheeled tractor, it will be understood that the operative arrangement is readily adaptable for mounting on tractors of the track-laying and other types. It will also be understood that the vehicle carrying the present shovel device is not necessarily self-propelled.

From the foregoing description taken in connection with the accompanying drawings, the advantages of the construction and operation of the present shovel unit for a tractor will be readily understood by those skilled in the art to which this invention appertains. While I have described the features and principles of operation of an assembly which I now consider to comprise a preferred embodiment of my invention, I desire to have it understood that the showing is primarily illustrative, and that such changes may be made, when desired, as fall within the scope of the following claims.

I claim:

1. In a vehicular shovel, a supporting vehicle, a scoop, a rigid frame carrying said scoop at its forward end, means pivotally mounting the rear end portion of the frame on the vehicle for the swinging of the frame about an axis parallel to the support base of the vehicle, means to adjustably dispose and support the forward end portion of the frame on the vehicle to slope the frame downwardly or upwardly from its said axis of swinging, and means whereby said axis is automatically and progressively raised as the frame is swinging into an upwardly sloping position with respect to the axis.

2. In a vehicular shovel, a supporting vehicle, a scoop provided with a normally withdrawn pusher plate operative within the scoop to propel a load forwardly therein and therefrom, a rigid frame carrying said scoop at its forward end and in fixed relation to the frame, means mounting the rear end portion of the frame on the vehicle for the swinging of the frame about an axis parallel to the support base of the vehicle, means to adjustably dispose and support the forward end portion of the frame on the vehicle to slope the frame downwardly or upwardly from its said axis of swinging, means whereby said axis is automatically raised as the frame is swinging into an upwardly sloping position with respect to the axis, and means operative to actuate said pusher plate.

3. In a vehicular shovel, a supporting vehicle having a rear wheel axle, a scoop, a rigid frame carrying said scoop at its forward end and in fixed relation to the frame, arms mounted on the vehicle for oscillation about the axis of said wheel axle and hingedly mounting the rear end portion of the frame for the swinging of the frame about an axis spaced from and parallel to the first axis, means to adjustably dispose and support the forward end portion of the frame on the vehicle to slope the frame downwardly or upwardly from its axis of hinging on said arms to variably space the scoop from the support base of the vehicle, and means so coactive between the vehicle and frame as to dispose the arms in substantially prone position when the frame slopes downwardly from its hinging axis and to dispose the arms in substantially upright position when the frame slopes upwardly from its hinging axis and the scoop is in substantially its fully raised position.

4. In a vehicular shovel, a supporting vehicle having a rear drive axle, a scoop provided with a normally withdrawn pusher plate for operation to propel a load forwardly in and from the scoop, a rigid frame fixedly carrying said scoop at its forward end, means constantly and yieldingly coactive between the push plate and frame to urge a withdrawn disposal of the push plate with respect to the scoop cavity, arms mounted on the vehicle for oscillation about the axis of said wheel axle and hingedly mounting the rear end portion of the frame for the swinging of the frame about an axis rearwardly of and parallel to the first axis, means to adjustably dispose and support the forward end portion of the frame on the vehicle to slope the frame downwardly and upwardly from its axis of hinging on said arms to variably space the scoop from the support plane of the vehicle, means so coactive between the vehicle and frame as to dispose the arms in substantial alignment with the frame when the latter slopes downwardly from its hinging axis and to dispose the arms in substantially upright position when the frame slopes upwardly from its hinging axis and the scoop is in substantially its fully raised position, a power unit carried directly on the vehicle, and means for operating the push plate of the scoop including a cable connection between the power unit and push plate, said cable connection being of constant effective length for all positions of the frame.

5. In a vehicular shovel, a supporting vehicle having a rear wheel axle, a power means on said vehicle, a scoop and means to unload the same, a frame carrying said scoop at its forward end, means mounting the rear portion of the frame on the vehicle for the swinging of the frame about an axis spaced from and parallel to the support base of the vehicle, means to adjustably dispose and support the forward portion of the frame on the vehicle to slope the frame downwardly or upwardly from its said axis of swinging, means whereby said axis is automatically and progressively raised with respect to the support base of the vehicle as the frame is swung into an upward sloping position with respect to the axis, and means for actuating the scoop unloading means including a cable connection between the power unit and unloading means, said cable connection being of constant effective length and being operatable for all positions of the frame on the vehicle.

6. In a vehicular shovel, a supporting vehicle having a rear wheel axle, a scoop, a frame directly carrying said scoop at its forward end, arms mounted on the vehicle for oscillation about the axis of said wheel axle and hingedly mounting the rear end portion of the frame for the swinging of the frame about an axis spaced from and parallel to the first axis and between lowered and raised positions thereof, means operative at a forward frame point to raise and lower the frame, and a guide means so coactive between the vehicle and frame as to dispose the arms in substantial alignment with the frame when the same is lowered and to dispose the arms in substantially upright position when the frame is in substantially its fully raised position.

7. In a vehicular shovel, a supporting vehicle having a rear wheel axle, a power unit on said vehicle, a scoop and means thereof operative to unload the same, a frame directly carrying said scoop at its forward end, arms mounted on the vehicle for oscillation about the axis of said wheel axle and hingedly mounting the rear end portion of the frame for the swinging of the frame about an axis spaced from and parallel to the first axis and between lowered and raised positions thereof, means operative at a forward frame point to raise and lower the frame, a guide means so coactive between the vehicle and frame as to dispose the arms in substantial alignment with the frame when the same is lowered and to dispose the arms in substantially upright position when the frame is in substantially its fully raised position, an idler pulley mounted on the vehicle for rotation about the axle axis, an idler pulley mounted at the hinged connection of the arms and frame for rotation about their axis of hinging, and means for operating the unloading means of the scoop from the power unit including a flexible cable passing around both said pulleys whereby the cable is of constant effective length for all adjusted positions of the frame.

HENRY A. TIESLAU.